United States Patent [19]
Thiessen

[11] Patent Number: 5,687,832
[45] Date of Patent: Nov. 18, 1997

[54] FLEXIBLE BLADED AUGER

[76] Inventor: Terry Thiessen, Box 2351, Strathmore, Alberta, Canada, T1P 1K3

[21] Appl. No.: 602,117

[22] Filed: Feb. 15, 1996

[51] Int. Cl.$^6$ .................................................. B65G 33/26
[52] U.S. Cl. ........................................... 198/676; 198/677
[58] Field of Search .................................. 198/659, 670, 198/674, 676, 677

[56] References Cited

U.S. PATENT DOCUMENTS

| | | | |
|---|---|---|---|
| 2,397,305 | 3/1946 | Wheat | 198/676 |
| 2,441,100 | 5/1948 | Marsden | 198/674 X |
| 2,760,624 | 8/1956 | Lompton | 198/677 |
| 3,194,385 | 7/1965 | Barnese | 198/676 |
| 3,937,317 | 2/1976 | Flury, Jr. | 198/676 |
| 4,666,033 | 5/1987 | Reid | 198/677 X |
| 4,949,836 | 8/1990 | Schostek | 198/676 |
| 5,085,313 | 2/1992 | Naumec et al. | 198/659 |
| 5,361,988 | 11/1994 | Nelson | 198/676 X |

FOREIGN PATENT DOCUMENTS

| | | | |
|---|---|---|---|
| 1027506 | 3/1978 | Canada | 198/659 |
| 1044991 | 9/1983 | U.S.S.R. | 198/659 |
| 0708177 | 4/1954 | United Kingdom | 198/676 |
| 1351751 | 5/1974 | United Kingdom | 198/676 |

*Primary Examiner*—James R. Bidwell
*Attorney, Agent, or Firm*—G. F. Gallinger

[57] ABSTRACT

An auger for moving granular material and slurries of granular materials comprising: a shaft; a rigid inner blade portion fastened to and spiraling around the shaft; and a flexible substantially larger outer blade portion carried by the inner blade portion. In the preferred embodiment the flexible blade portion comprises belting cut into the shape of a split doughnut shaped disc. The split doughnut shaped disc has a larger inside diameter than the diameter of the shaft so that when it is rolled around the shaft and fastened to the rigid inner blade portion it extends more than one revolution therearound. The problem faced in the movement of granular materials is that rocks, stones or other non-uniformly large pieces of material predictably are present in the material being handled. These larger pieces sink to the bottom of the auger and jam between it and the bottom of a trough therebelow. These larger pieces either stop the auger until they are removed, or alternatively they are pulverised, damaging the auger. The dislosed auger having an outer flexible blade portion inexpensively and effectively solves this problem.

17 Claims, 1 Drawing Sheet

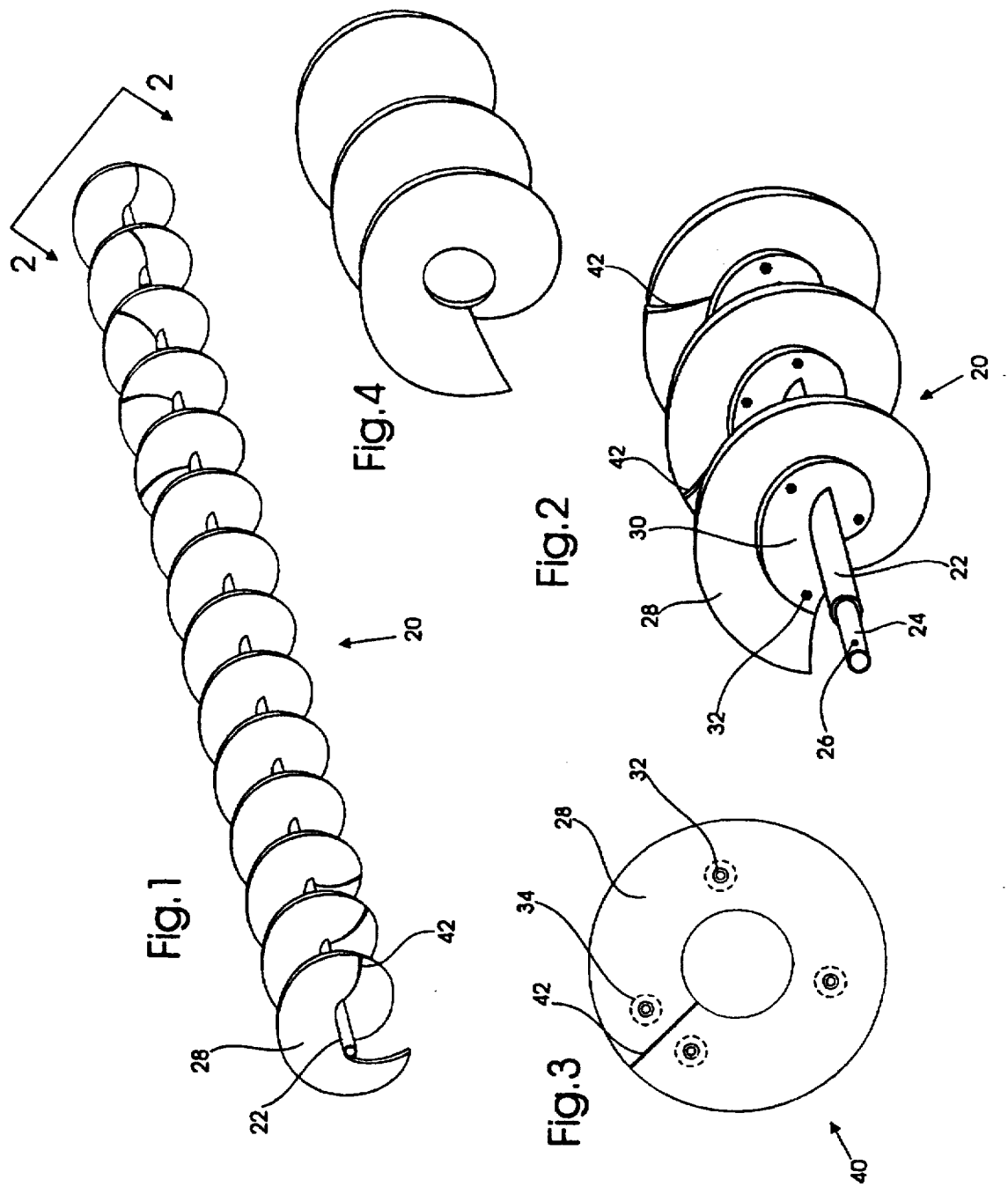

FLEXIBLE BLADED AUGER

FIELD OF THE INVENTION

This invention relates to augers or screws used to move granular materials such as sand or dirt. It also relates to augers used to move slurries of granular materials such as concrete. More particularly it relates to such augers which have a flexible blade portion.

BACKGROUND OF THE INVENTION

Augers are used in many material handling applications to move loose granular material and slurries or mixtures of wet granular materials. The problem faced in most of these applications is that rocks, stones or other non-uniformly large pieces of material predictably are present in the material being handled. These larger pieces sink to the bottom of the auger and jam between it and the bottom of a trough or housing therebelow. These larger pieces either stop the auger until they are removed, or alternatively they are pulverised, damaging the auger.

Many individuals, appreciative of the regulated and controlled delivery that an auger provides, have struggled with this problem. One solution has been to provide an extremely heavy auger and trough. Extremely expensive and heavy augers having blade portions which are 1 inch thick are used to move concrete slurry in shops producing pre-formed concrete. These augers are heavy enough to grind occasional larger stones which jam underneath the auger above the bottom of the trough. In addition to the expense, another problem with the approach of using very heavy augers is that substantial clearance must be provided between the auger and the trough. This reduces control over delivery, reduces pumping efficiency, and reduces pumping pressure.

OBJECTS AND STATEMENT OF THE INVENTION

It is an object of this invention to disclose an auger having flexible blades. It is an object of this invention to disclose an auger which is effective for moving granular materials and relatively inexpensive to produce. It is yet another object of this invention to disclose an auger which is highly resistant to the wear and corrosion from the granular materials. It is yet another object of this invention to disclose an auger which may have its flexible blade portion replaced quickly and inexpensively. It is yet another object of this invention to disclose an inexpensive flexible blade portion for an auger and a method of applying that blade portion to an auger. It is a final object of this invention to disclose an auger which may operate with zero clearance between it and a trough or housing.

One aspect of this invention provides for an auger for moving granular material and slurries of granular materials comprising: a shaft; a rigid spiraling inner blade portion fastened to and around the shaft; and, a flexible substantially larger outer blade portion carried by the inner blade portion.

A preferred aspect of this invention provides for a flexible blade portion which comprises belting cut into a split doughnut shaped disc which is thereafter screwed to the rigid inner blade portion of the auger. The split doughnut shaped disc has a larger inside diameter than the diameter of the shaft so that when it is rolled around the shaft and fastened to the inner blade portion it extends more than one revolution therearound. When the auger has multiple discs, this results in the splits between discs extending from the shaft at different angles, so that when the auger is turned in a trough the increased load occurring when each split enters the lower trough portion occurs at different angles throughout the rotation of the auger.

Various other objects, advantages and features of novelty which characterize this invention, are pointed out with particularity in the claims annexed to, and forming part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art when consideration is given to the following detailed description thereof. Such description make reference to the annexed drawings wherein:

FIG. 1 is a perspective top left view of an auger having a flexible blade portion.

FIG. 2 is a partial enlarged perspective top right view of the auger shown in FIG. 1 taken along line 2—2.

FIG. 3 is a disc of conveyor belt, complete with large headed mounting bolts, ready for use on an auger having a flexible blade portion.

FIG. 4 is a continuous spiral which may be mounted on the rigid inner blade portion as a substitute for the discs.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a top left perspective view of an auger 20 having a flexible blade portion 28. FIG. 2 is a partial enlarged perspective top right view of the auger 20 shown in FIG. 1 taken along line 2—2. The auger 20 for moving granular material and slurries of granular materials comprises: a shaft 22; a rigid spiraling inner blade portion 30 fastened to and around the shaft 22; and a flexible substantially larger outer blade portion 28 carried by the inner blade portion 30. The flexible outer blade portion 28 may comprise belting fastened to the inner blade portion 30. In this application belting is defined to include any generally flat flexible rubberized or plastic conveyor belt material. The belting may or may not be reinforced with cord or other material.

FIG. 3 is a disc of conveyor belt 40, ready for use on an auger 20 having a flexible blade portion 28. The flexible blade portion 28 is made by cutting belting into a split doughnut shaped disc 40 having a larger inside diameter than the diameter of the shaft 22 on which it is to be used, so that when it is rolled around the shaft 22 and fastened to the inner blade portion 30 thereof, it extends more than one revolution therearound. The split 42 therethrough extends preferably radially from an inner to an outer diameter of the doughnut shaped disc 40. When the auger 20 has multiple discs 40, this results in the splits 42 between discs 40 extending from the shaft 22 at different angles, (best shown in FIG. 1) so that when the auger 20 is turned in a trough (not shown) the increased load occurring when each split 40 enters the lower trough portion (not shown) occurs at different angles throughout the rotation of the auger 20. The disc 40 is fastened to the inner rigid blade portion 30 with with four bolts 34, and nuts 32, each bolt 34 having a countersink enlarged flat head, and extending through a central diametric portion of the disc 40. In this application a disc 40 is defined to include a segment of a disc 40 or a disc which is missing a segment thereof.

FIG. 4 is a continuous spiral 43 which may be mounted on the rigid inner blade portion 30 as a substitute for the belting or discs 40 which are fastened to the inner blade portion 30. The continuous spiral 43 is preferably molded from a rubber or plastic material. It may or not be reinforced. In this application a continuous spiral 43 is defined to include any molded flexible blade portion 28 which wraps more than 360 degrees around the rigid inner blade portion 30. It is contemplated that to reduce mold costs that 2 or more similar continuous spirals 43 may be used which will together extend the length of the auger 20.

A method of constructing an auger 20 having a flexible outer blade portion 28 comprises the following steps: cutting a doughnut shaped disc 40 from belting, said doughnut shaped disc 40 having a split 42 therethrough extending from an inner diameter to an outer diameter thereof, and preferably having a larger inside diameter than the diameter of the shaft (so that when it is rolled around a shaft 22 of the auger 20 and fastened to the inner blade portion 30 thereof, it extends more than one revolution therearound); and, fastening, preferably by bolting, an inside portion of the doughnut shaped disc 40 to a rigid blade portion 30 of an auger 20. The auger 20 may be fabricated by spirally fastening a rigid blade portion 28 around a shaft 22.

As an example, intended for illustration purposes without limiting the generality of the forgoing, a 6⅜" diameter auger has been fabricated on a shaft 22 being a 1" pipe using discs 40 having a 2⅜" inside diameter and a 6⅞" outside diameter.

A method of constructing an auger having a continuous flexible outer blade portion comprises the following steps: molding a continuous flexible spiral; spirally fastening a rigid blade portion around a shaft; and, fastening, preferably by bolting, an inner portion of the continuous flexible spiral to the rigid blade portion around the shaft.

In the preferred embodiment one end of the auger shaft 22 is adapted for coupling to a drive (not shown). Said coupling shaft end 24 has a reduced diameter and is provided with a hole 26 extending therethrough. The other end of the auger shaft 22 is maintained in position by a steel sleeve (not shown) having an inside diameter equal to the outside diameter of the augur 20.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A method of constructing an auger for moving granular material and slurries of granular materials having a flexible outer blade portion comprising the following steps:

cutting a doughnut shaped disc from flat rubberized and corded belting, said doughnut shaped disc having a split therethrough extending from an inner diameter to an outer diameter thereof; and, fastening an inside portion of the doughnut shaped disc to a riged blade of a portion of an auger.

2. A method as in claim 1 wherein fastening comprises bolting.

3. A method as in claim 2 wherein the split doughnut shaped disc has a larger inside diameter than the diameter of the shaft so that when it is rolled around a shaft of the auger and fastened to the inner blade portion thereof, it extends more than one revolution therearound.

4. A method as in claim 3 further comprising the step of fabricating the auger having a rigid blade portion by spirally fastening a rigid blade portion around a shaft.

5. A flexible blade portion for an auger comprising:

a doughnut shaped disc having a split therethrough extending from an inner to an outer diameter thereof wherein the inner diameter of the disc is substantially larger than a shaft diameter of the auger so that when the flexible blade portion is installed thereon it will extend substantially more than one revolution therearound.

6. A flexible blade portion as in claim 5 wherein the disc is cut from belting.

7. A flexible blade portion as in claim 6 further comprising bolts extending through a central diametric portion thereof.

8. A flexible blade portion as in claim 6 wherein said bolts have an enlarged flat countersunk head and are provided with nuts.

9. A flexible blade portion as in claim 6 wherein the disc is provided with four bolts.

10. An auger for moving granular materials and slurries of granular materials comprising:

a rigid spiralling inner blade portion fastened to and around a shaft;

a flexible substantially larger outer blade portion carried by the inner blade portion; wherein the flexible outer blade portion comprises belting fastened to the inner blade portion.

11. An auger as in claim 10 wherein the belting comprises a split doughnut shaped disc which is fastened solely by screwing to the rigid inner blade portion.

12. An auger as in claim 11 wherein the split doughnut shaped disc has a larger inside diameter than the diameter of the shaft so that when it is rolled around the shaft and fastened to the inner blade portion it extends more than one revolution therearound.

13. An auger as in claim 12 wherein the screws to fasten the flexible blade portion to the rigid inner blade portion comprise bolts having a countersunk enlarged flat head.

14. An auger as in claim 12 wherein one end of the auger shaft is adapted for coupling.

15. An auger as in claim 14 wherein the coupling end of the shaft has a reduced diameter and is provided with a hole extending therethrough.

16. A method of moving a slurry of granular material comprising the following steps:

fastening a rigid spiralling inner blade portion having opposite side portions extending generally radially from and around a shaft; and, fastening a flexible substantially larger outer blade portion to one and only one opposite side portion of the inner blade portion.

17. A method as in claim 16 wherein the slurry is concrete.

* * * * *